United States Patent
Roman et al.

(10) Patent No.: US 9,346,537 B2
(45) Date of Patent: May 24, 2016

(54) WINGLET SYSTEM

(71) Applicant: The Boeing Company, Chicago, IL (US)

(72) Inventors: Dino L. Roman, Lake Forest, CA (US); John C. Vassberg, Long Beach, CA (US); Douglas M. Friedman, Irvine, CA (US); Adam P. Malachowski, Lynnwood, WA (US); Christopher A. Vegter, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/942,988

(22) Filed: Nov. 16, 2015

(65) Prior Publication Data

US 2016/0068259 A1 Mar. 10, 2016

Related U.S. Application Data

(63) Continuation of application No. 14/566,483, filed on Dec. 10, 2014, now Pat. No. 9,216,817, which is a continuation of application No. 13/436,355, filed on Mar. 30, 2012, now Pat. No. 8,936,219.

(51) Int. Cl.
*B64C 23/06* (2006.01)

(52) U.S. Cl.
CPC .................... *B64C 23/065* (2013.01)

(58) Field of Classification Search
CPC ................ B64C 23/065; B64C 3/56
USPC ........... 244/91, 199.3, 199.4, 45 R, 130, 218
See application file for complete search history.

(56) References Cited

U.S. PATENT DOCUMENTS

| | | | |
|---|---|---|---|
| 1,466,551 | A | 7/1923 | Thurston |
| 1,841,921 | A | 1/1932 | Spiegel |
| 1,888,418 | A | 11/1932 | Adams |
| 2,576,981 | A | 2/1951 | Vogt |
| 2,743,888 | A | 5/1956 | Lippisch |

(Continued)

FOREIGN PATENT DOCUMENTS

| | | |
|---|---|---|
| DE | 634884 | 9/1936 |
| DE | 2149956 | 4/1973 |

(Continued)

OTHER PUBLICATIONS

AERO "Blended Winglets Improve Performance," Mar. 2009.

(Continued)

*Primary Examiner* — Philip J Bonzell
*Assistant Examiner* — Michael Kreiner

(57) ABSTRACT

A winglet system for an aircraft wing may include an upper winglet and a lower winglet mounted to a wing tip. The upper winglet root chord and the lower winglet root chord may each have a length of no greater than 100 percent of the wing tip chord. The lower winglet may have a static position when the wing is subject to an on-ground static loading. The lower winglet may be configured such that upward deflection of the wing under an approximate 1-g flight loading causes the lower winglet to move upwardly and outwardly from the static position to an in-flight position resulting in an effective span increase of the wing under the approximate 1-g flight loading relative to the span of the wing under the on-ground static loading.

20 Claims, 10 Drawing Sheets

(56) References Cited

U.S. PATENT DOCUMENTS

| | | | |
|---|---|---|---|
| 3,027,118 | A | 1/1960 | Willox |
| 3,027,098 | A | 9/1966 | Cone |
| 3,270,988 | A | 9/1966 | Cone |
| 3,684,217 | A | 8/1972 | Kukon |
| 3,712,564 | A | 1/1973 | Rethorst |
| 3,840,199 | A | 10/1974 | Tibbs |
| 4,046,336 | A | 9/1977 | Tangier |
| 4,108,403 | A | 8/1978 | Finch |
| 4,172,574 | A | 10/1979 | Spillman |
| 4,190,219 | A | 2/1980 | Hackett |
| 4,205,810 | A | 6/1980 | Ishimitsu |
| 4,245,804 | A | 1/1981 | Ishimitsu |
| 4,382,569 | A | 5/1983 | Boppe |
| 4,455,004 | A | 6/1984 | Whitaker |
| 4,457,479 | A | 7/1984 | Daude |
| 4,541,593 | A | 9/1985 | Cabrol |
| 4,545,552 | A | 10/1985 | Welles |
| 4,595,160 | A | 6/1986 | Santos |
| 4,667,906 | A | 5/1987 | Suarez et al. |
| 4,671,473 | A | 6/1987 | Goodson |
| 4,674,709 | A | 6/1987 | Welles |
| 4,700,911 | A | 10/1987 | Zimmer |
| 4,714,215 | A | 12/1987 | Jupp |
| 4,722,499 | A | 2/1988 | Klug |
| 4,776,542 | A | 10/1988 | Van Dam |
| 5,039,032 | A | 8/1991 | Rudolph |
| 5,082,204 | A | 1/1992 | Croston |
| 5,102,068 | A | 4/1992 | Gratzer |
| 5,156,358 | A | 10/1992 | Gerhardt |
| 5,275,358 | A | 1/1994 | Goldhammer |
| 5,348,253 | A | 9/1994 | Gratzer |
| 5,407,153 | A | 4/1995 | Kirk |
| 5,435,504 | A | 7/1995 | Inoue |
| 5,634,613 | A | 6/1997 | McCarthy |
| 5,788,191 | A | 8/1998 | Wake |
| 5,909,858 | A | 6/1999 | Hawley |
| 5,975,464 | A | 11/1999 | Rutan |
| 5,992,793 | A | 11/1999 | Perry |
| 6,089,502 | A | 7/2000 | Herrick |
| 6,161,797 | A | 12/2000 | Kirk |
| 6,345,790 | B1 | 2/2002 | Brix |
| 6,484,968 | B2 | 11/2002 | Felker |
| 6,547,181 | B1 | 4/2003 | Hoisington |
| 6,578,798 | B1 | 6/2003 | Dizdarevic |
| 6,726,149 | B2 | 4/2004 | Wojciechowski |
| 6,827,314 | B2 | 12/2004 | Barriety |
| 6,886,778 | B2 | 5/2005 | McLean |
| 6,929,219 | B2 | 8/2005 | Wojciechowski |
| 7,048,228 | B2 | 5/2006 | Vassberg |
| 7,275,722 | B2 | 10/2007 | Irving |
| 7,988,100 | B2 | 8/2011 | Mann |
| 2004/0155146 | A1 | 8/2004 | Wyrembek |
| 2005/0184196 | A1 | 8/2005 | Shmilovich |
| 2006/0027703 | A1 | 2/2006 | Bussom |
| 2007/0018049 | A1 | 1/2007 | Stuhr |
| 2008/0191099 | A1 | 8/2008 | Werthmann |
| 2009/0039204 | A1 | 2/2009 | Eberhardt |
| 2009/0084904 | A1 | 4/2009 | Detert |
| 2009/0224107 | A1 | 9/2009 | McLean |
| 2009/0256029 | A1 | 10/2009 | Malachowski |
| 2011/0272530 | A1 | 11/2011 | Mann |
| 2012/0112005 | A1 | 5/2012 | Chaussee et al. |
| 2012/0312928 | A1 | 12/2012 | Gratzer |

FOREIGN PATENT DOCUMENTS

| | | |
|---|---|---|
| DE | 19926832 | 1/2001 |
| EP | 0094064 | 11/1983 |
| EP | 0113466 | 7/1984 |
| EP | 1493660 | 1/2005 |
| FR | 2541231 | 8/1984 |
| FR | 2780700 | 1/2000 |
| WO | WO 2012/007358 | 1/2012 |

OTHER PUBLICATIONS

AERO "Blended Winglets for Improved Airplane Performance," Jan. 2002.
Unroad Warrior "Wing Tips: Boeing vs. Airbus," Mar. 28, 2011.
smartcockpit.com, "Understanding Winglets Technology," retrieved on Mar. 23, 2012.
Flight Global—Flight Blogger, "Blended scimitar-tipped split winglet," Oct. 17, 2011, available at <http://www.flightglobal.com/blogs/flightblogger/2011/10/split-scimitar-winglet-next-on.html>.
Flight Global, "NBAA: Aviation Partners splits winglets," Oct. 11, 2011, available at <http://www.flightglobal.com/news/articles/nbaa-aviation-partners-splits-winglets-for-performance-boost-363281/>.
Tourism and Aviation, "Airbus sues Aviatin Partners," Mar. 23, 2012.
PCT International Search Report for PCT/US2008/076055 U.S. Appl. No. 11/866,209); Jun. 8 2006, European Patent Office.
Pfenninger et al., "About the Design Philosphy of Long Range LFC Transports with Advanced Supercrilical LFC Airfoils," AIM 19th Fluid Dynamics, Plasma Dynamics and Laser Conference, AIAA 87. Jun. 8-10, 1987.
Whitcomb, Richard T., "A Design Approach and Selected Wind-Tunnel Results at High Subsonic Speeds for Wing-Tip Mounted Winglets," NASA Technical Note 8260—National Aeronautics and Space Administration—Washington D.C., Jul. 1976.
Wilcox el al. Stimultaneous Optimization of a Multiple-Aircraft Family: Journal of Aircraft, Jul. 2003 pp. 616-622.
Desktopaero, Wing Design Parameters (4 pages) http://www.desktopaero.com/appliedaero/wingdesignwingparams.html.
Boeing AERO, From AERO No. 17, Blended Winglets, accessed Jun. 19, 2012.
Cone, "The Theory of Induced Lift and Minimum Induced Drag of Non-Planar Lifting Systems," NASA Technical Report R-139 National Aeronautics and Space Administration, Issued Aug. 16, 1963.
Craig et al., "Spanload Optimization for Strength Designed Lifting Surfaces," AIM 6th Applied Aerodynamics Conference, The Boeing Company, Jul. 6-8, 1988.
Design and Analysis of Winglets for Military Aircraft. Technical Report AFFDL-TR-76-3, Feb. 1976.
Kroo, I., Non-Planar Wing Concepts for Increased Aircraft Efficiency, Lecture series on Innovative Configurations and Advanced Concepts for Future Civil Aircraft, Jun. 6-10, 2005, 29 pages.
La Roche et al., Wing-Grid, a Novel Device for Reduction of Induced Drag on Wings, La Roche Consulting presented at ICAS 96 in Sorrento, Italy.
McLean, Doug, Wingtip Devices: What They Do and How They Do it. Boeing Aerodynamics—Article 4, 2005. 20 pages.
Flechner et al., "Experimental Results of Wing Tests on First, Second, and Third Generation Jet Transports," NASA Technical Memorandum 72674, May 1978.
EP 14160595, Euroean Search Report, dated Aug. 22, 2014.
European Search Report for EP13161307, dated Dec. 12, 2013.

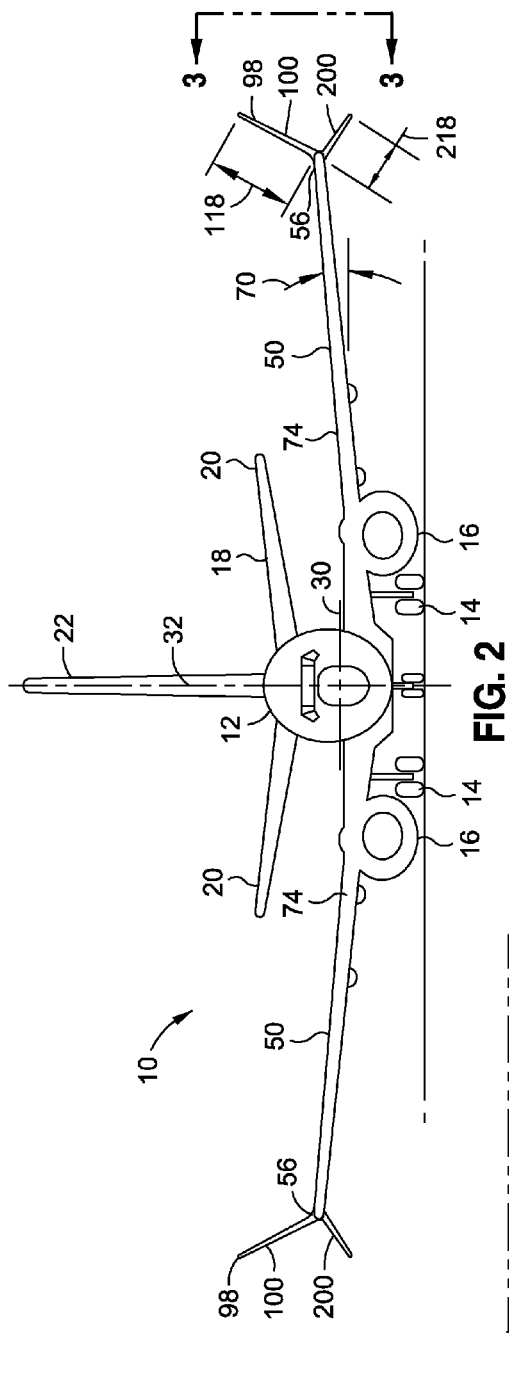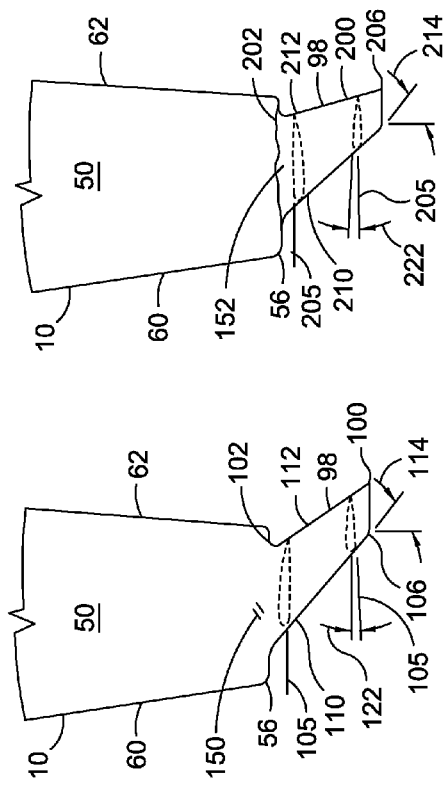

WINGLET SYSTEM

CROSS-REFERENCE TO RELATED APPLICATIONS

The present application is a continuation application of and claims priority to pending U.S. application Ser. No. 14/566,483, filed on Dec. 10, 2014, and entitled WINGLET SYSTEM AND METHOD, which is a continuation application of U.S. Pat. No. 8,936,219, application Ser. No. 13/436,355, filed on Mar. 30, 2012, and entitled PERFORMANCE-ENHANCING WINGLET SYSTEM AND METHOD, the entire contents of each one of the above-referenced applications being expressly incorporated by reference herein.

FIELD

The present disclosure relates generally to aerodynamics and, more particularly, to wing tip devices such as for the wings of an aircraft.

BACKGROUND

Induced drag is generated by an aircraft wing due to the redirection of air during the generation of lift as the wing moves through the air. The redirection of the air may include spanwise flow along the underside of the wing along a generally outboard direction toward the wing tips where the air then flows upwardly over the wing tips. The air flowing over the tips joins a chordwise flow of air over the wing resulting in the formation of wing tip vortices. The wing tip vortices are fed by other vortices that are shed by the trailing edge of the wing. The downwash of vortices trailing from the wing reduces the effective angle of attack of the wing which results in a reduction in generated lift.

Winglets provide a means for reducing the negative effects of induced drag such as by effectively increasing the length of the trailing edge of the wing. The effective increase in the length of the trailing edge may spread out the distribution of the vortices which may reduce losses from induced drag. In this regard, winglets may provide a significant reduction in induced drag which may improve the performance of the aircraft. Furthermore, winglets may provide an increase in effective trailing edge length without increasing the length of the wing leading edge. Additionally, by adding winglets to the wings instead of increasing the wing span in the conventional manner by extending the wing tips, the added weight, cost, and complexity associated with lengthening of leading edge lift-enhancement devices (e.g., slats, Krueger flaps) may be avoided.

However, conventional winglets may increase the aerodynamic loading at the wing tips which may result in an increase in wing bending under high lift conditions. The increase in wing bending may require strengthening or stiffening of the wing structure which adds weight and which may negate the drag-reducing benefits provided by the winglets. In addition, the center of gravity of conventional winglets may be located at a relatively long distance from the torsional axis of the wing which may affect the flutter characteristics of the wing. In an attempt to counteract the inertial effects of conventional winglets, ballast may be added to the leading edge of the wing tip. Unfortunately, the addition of ballast may negate some of the drag-reducing benefits provided by the winglet. Conventional winglets may also suffer reduced aerodynamic efficiency due to flow separation that may occur at high loading conditions including at low speeds.

As can be seen, there exists a need in the art for a wing tip device that may reduce the induced drag of a wing without increasing wing bending. In addition, there exists a need in the art for a wing tip device which minimizes the impact on flutter characteristics of the wing. Furthermore, there exists a need in the art for a wing tip device that does not require the addition of ballast to overcome the inertial effects of a winglet on the flutter characteristics of the wing.

SUMMARY

Any one or more of the above-noted needs associated with conventional winglets may be specifically addressed and alleviated by the present disclosure which provides a winglet system for an aircraft wing wherein the winglet system includes an upper winglet and a lower winglet mounted to a wing tip. The lower winglet may have a static position when the wing is subjected to a ground static loading. The lower winglet may be configured such that upward deflection of the wing under an approximate 1-g flight loading causes the lower winglet to move from the static position to an in-flight position and resulting in a relative span increase of the wing.

Also disclosed is an aircraft having a pair of wings with each wing having a wing tip. The aircraft may include an upper winglet and a lower winglet mounted to each one of the wing tips. The lower winglets may be sized and oriented such that upward deflection of the wings under an approximate 1-g flight loading results in a relative span increase of the wings.

In a further embodiment, disclosed is a method of enhancing the performance of an aircraft including the step of providing an upper winglet and a lower winglet on a wing. The lower winglet may have a static position when the wing is subject to a ground static loading. The method may further include upwardly deflecting the wing under an approximate 1-g flight loading. In addition, the method may include moving the lower winglet from the static position to an in-flight position during upward deflection of the wing. The method may also include causing a relative span increase of the wing when moving the lower winglet from the static position to the in-flight position.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a front view of the aircraft illustrating an upper winglet and a lower winglet included with the winglet system mounted to each wing tip;

FIG. 3 is a side view of one of the winglet systems taken along line 3 of FIG. 2 and illustrating the upper winglet and the lower winglet mounted to a wing tip;

FIG. 4 is a top view of the upper winglet taken along line 4 of FIG. 3 and illustrating a twist angle or washout that may optionally be incorporated into the upper winglet;

FIG. 5 is a top view of the lower winglet taken along line the 5 of FIG. 3 and illustrating a twist angle that may optionally be incorporated into the lower winglet;

DETAILED DESCRIPTION

Figure 1:
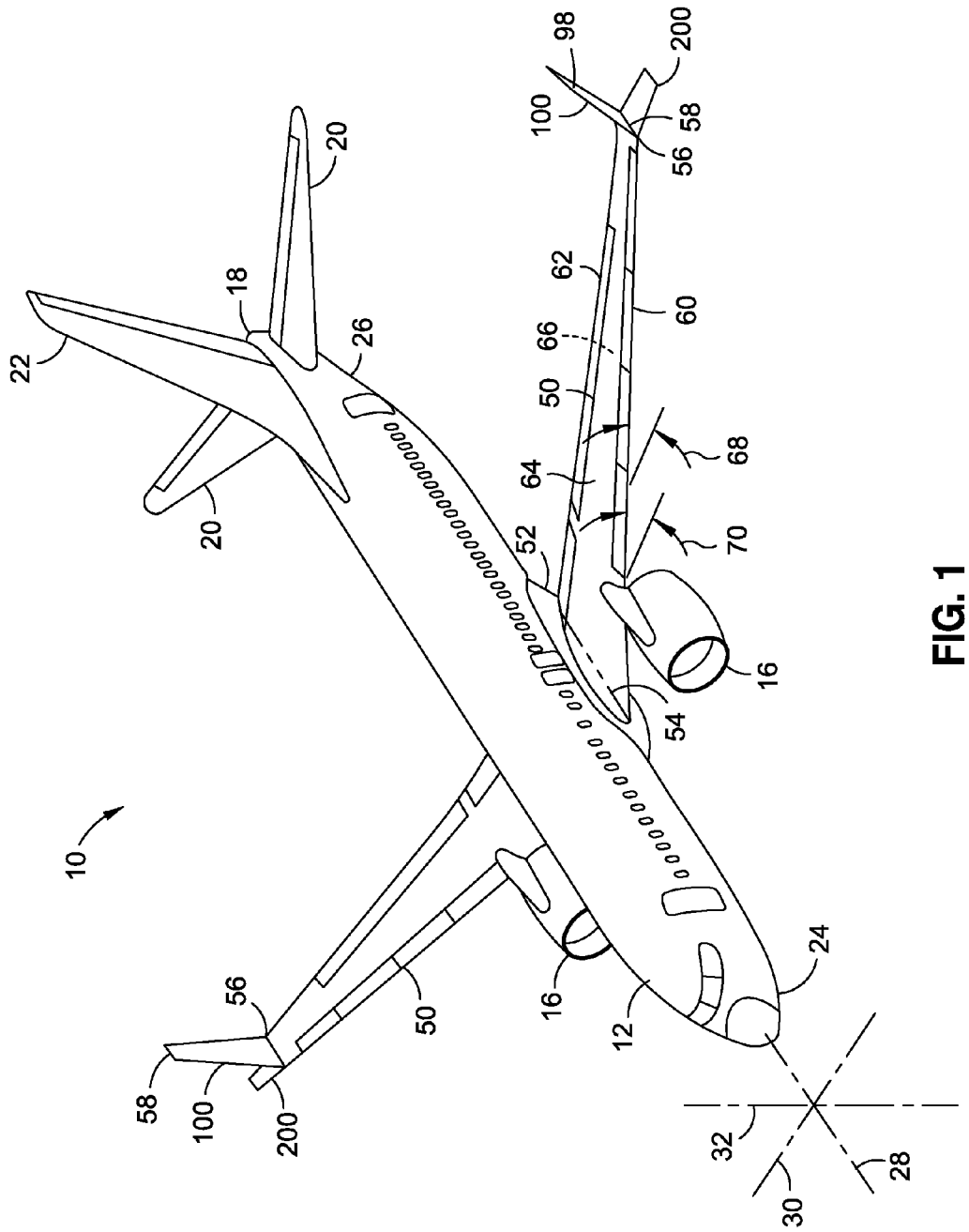
FIG. 1 is a perspective illustration of an aircraft having a winglet system mounted on each wing tip of the wings.

Referring now to the drawings wherein the showings are for purposes of illustrating various embodiments of the present disclosure, shown in FIG. 1 is a perspective view of an aircraft 10 having a fuselage 12. The fuselage 12 may include a cabin for passengers and flight crew. The fuselage 12 may extend from a nose at a forward end 24 of the aircraft 10 to an empennage 18 at an aft end 26 of the fuselage 12. The empennage 18 may include one or more tail surfaces such as a vertical stabilizer 22 and/or a horizontal stabilizer 20 for control of the aircraft 10. The aircraft 10 may further include a pair of wings 50, one or more propulsion units 16, and nose and main landing gear 14 (FIG. 2). The wings 50 may include one or more winglet systems 98 as disclosed herein. Each winglet system 98 may comprise an upper winglet 100 and a lower winglet 200 and which may be mounted to a wing tip 56 of a wing 50.

It should be noted that although the winglet system 98 of the present disclosure is described in the context of a fixed wing passenger aircraft 10 such as the tube-and-wing aircraft 10 illustrated in FIG. 1, any one of the various winglet system 98 embodiments may be applied to any aircraft of any configuration, without limitation. For example, the winglet system 98 may be applied to any civil, commercial, or military aircraft. In addition, the embodiments of the winglet system 98 disclosed herein may be applied to alternative aircraft configurations and are not limited to the tube-and-wing aircraft 10 configuration illustrated in FIG. 1. For example, the disclosed embodiments may be applied to hybrid wing-body aircraft or blended-wing aircraft.

Figure 6:
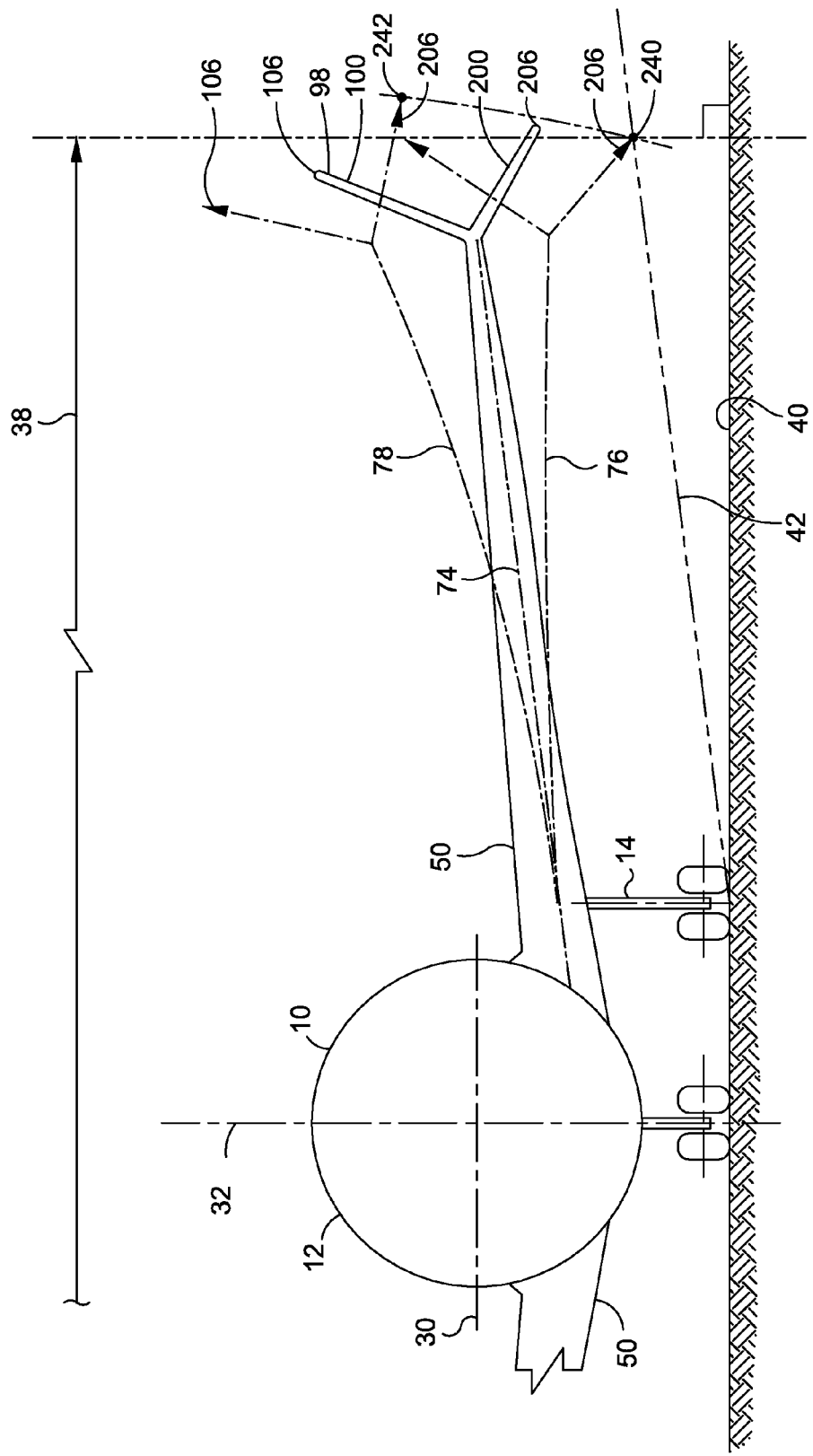
FIG. 6 is a schematic front view of one of the wings in a jigged shape, in a downwardly-deflected ground static loading shape, and in an upwardly-deflected 1-g flight loading (e.g., 1-g wing loading) shape.
Figure 7:
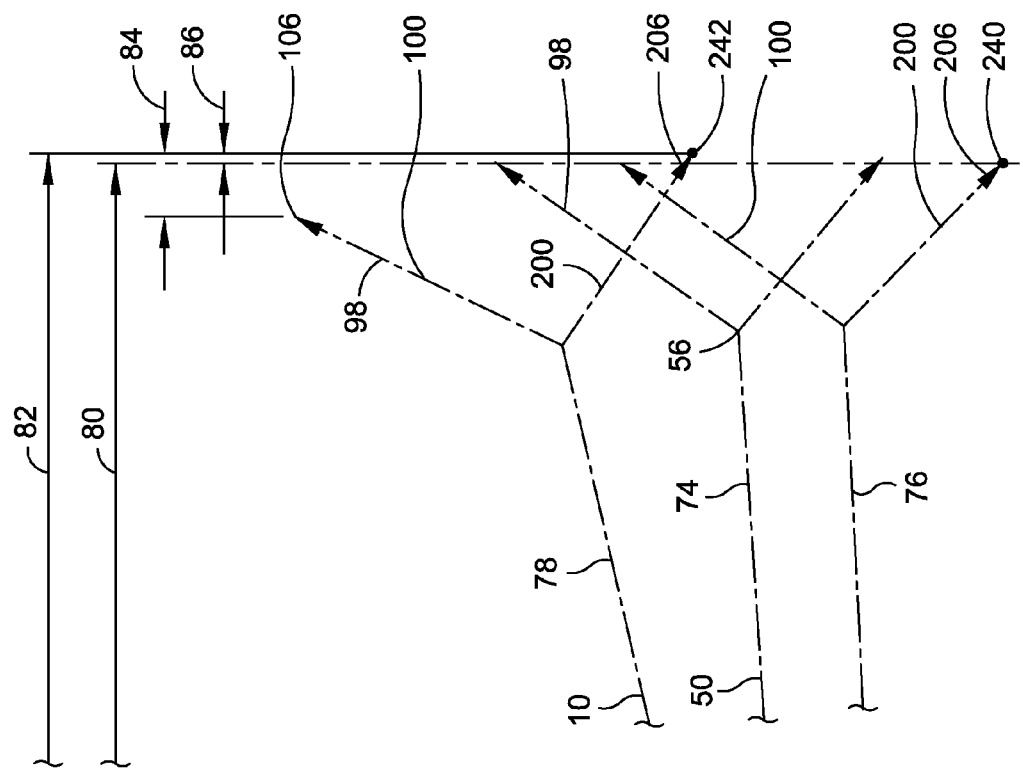
FIG. 7 is a schematic view of the relative positions of the upper and lower winglets for the wing in the three different shapes illustrated in FIG. 6.
Figure 8:
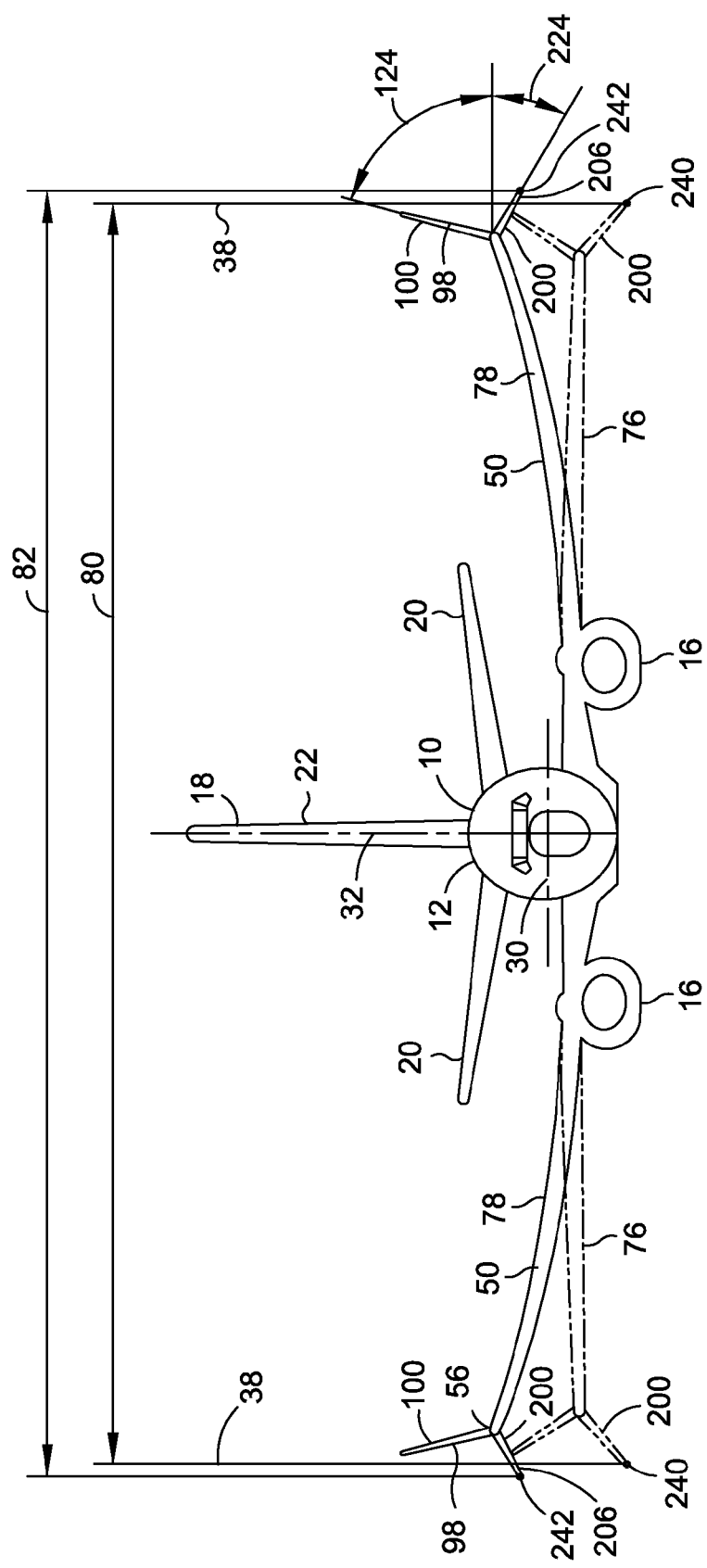
FIG. 8 is a front view of the aircraft illustrating the lower winglet on each wing tip being moved from a static position, wherein the wing is subjected to a ground static loading, to an in-flight position, wherein the wing is subjected to the approximate 1-g flight loading, and further illustrating an increase in effective wing span occurring in response to movement of the lower winglets from the static position to the in-flight position.

The winglet system 98 may also be applied to aerodynamic surfaces or lifting surfaces other than wings 50. For example, the winglet system 98 may be applied to a canard, to a control surface such as a horizontal stabilizer, or to any other lifting surface where it is desired to mitigate the adverse effects of induced drag and/or to enhance aerodynamic performance. Advantageously, the upper and lower winglets 100, 200 as disclosed herein may be provided in relatively large sizes with relatively long root chords and relatively high degrees of sweep and/or taper. The lower winglet 200 is advantageously provided with a relatively limited amount of anhedral angle 224 (FIG. 8) which results in an increase in effective wing span 80 (FIG. 8) when the wings 50 are aeroelastically deflected upwardly such as under an approximate 1-g flight loading 78 (FIG. 6) during cruise flight. In addition, the lower winglet 200 may also be configured to aeroelastically deflect upwardly under the approximate 1-g flight loading 78 and which may result in a relative span increase 84 (FIG. 7) and may contribute toward increasing the effective wing span 80 (FIG. 7) of the wings 50 as illustrated in FIGS. 6-8 and described in greater detail below. Advantageously, by increasing the effective wing span 80 due to the upward deflection of the wing 50 and/or due to upward deflection of the lower winglet 200, the lift-to-drag performance of the aircraft 10 may be improved.

In FIG. 1, the installation of the winglet system 98 on the aircraft 10 may be defined with regard to a coordinate system having a longitudinal axis 28, a lateral axis 30, and a vertical axis 32. The longitudinal axis 28 may be defined as extending through a general center of the fuselage 12 between the forward end 24 and the aft end 26. The lateral axis 30 may be oriented orthogonally relative to the longitudinal axis 28 and may extend generally along the wing 50 outboard directions relative to a center of the fuselage 12. The vertical axis 32 may be oriented orthogonally relative to the longitudinal and lateral axes 28, 30. Each one of the wings 50 of the aircraft 10 shown in FIG. 1 may extend from a wing root 52 having a root chord 54 to a wing tip 56 having a tip chord 58. Each wing 50 may have upper and lower surfaces 64, 66 and may include a wing leading edge 60 and a wing trailing edge 62. In the embodiment shown, the wing leading edge 60 may be formed at a wing sweep angle 68. Each wing 50 may extend upwardly at a dihedral angle 70. However, the wings 50 upon which the winglet systems 98 may be mounted may be provided in any geometric configuration and are not limited to the above-described arrangement for the aircraft 10 shown in FIG. 1.

FIG. 2 is a front view of the aircraft 10 supported by the landing gear 14 and illustrating a winglet system 98 mounted to the wing tip 56 of each wing. The wings 50 are shown in a jigged shape 74 (FIG. 6) wherein the wings 50 are relatively straight as may occur when the wings 50 are constrained by assembly tooling during the manufacturing of the aircraft 10. In one example, a jigged shaped (e.g., jigged shape 74—FIG. 6) may be defined as an equilibrium state (e.g., an unloaded state) of an elastic member (e.g., a wing 50). As indicated in greater detail below, when the aircraft 10 is supported by the landing gear 14, the wings 50 may typically assume a slightly downwardly-deflected shape under a ground static loading 76

(FIG. 6) due to the gravitational force acting on the mass of the wings 50, the propulsion units 16, and/or other systems supported by the wings 50.

Each wing tip 56 may include a winglet system 98 comprising the upper winglet 100 and the lower winglet 200. The upper winglet 100 may have an upper winglet root 102 which may be affixed or otherwise coupled to the wing 50 at the wing tip 56. The upper winglet 100 may extend as a relatively straight member toward the upper winglet tip 106. Likewise, the lower winglet 200 may have a lower winglet root 202 which may be affixed to the wing 50 at the wing tip 56. In an embodiment, the lower winglet root 202 may intersect or may be joined with the upper winglet root 102 at the wing tip 56. The lower winglet 200 may extend as a relatively straight member toward the lower winglet 206 tip. However, the upper winglet 100 and/or the lower winglet 200 may be provided in a non-straight shape and may include curved shapes or contoured shapes and may further include combinations of straight shapes, curved shapes, and contoured shapes.

The upper winglet 100 may have an upper winglet length 118 (e.g., a semi-span) extending from the upper winglet root 102 to the upper winglet tip 106. In the embodiment shown, the upper winglet length 118 may be longer than a lower winglet length 218 of the lower winglet 200. In an embodiment, the lower winglet 200 may have a lower winglet length 218 of at least approximately 50 percent of the upper winglet length 118 of the upper winglet 100. In a further embodiment, the lower winglet 200 may have a lower winglet length 218 in the range of from approximately 50 to 80 percent of the upper winglet length 118 of the upper winglet 100. In an embodiment of a commercial transport aircraft 10, the upper winglet 100 may be provided in an upper winglet length 118 of from approximately 50 to 150 inches. For example, the upper winglet 100 may be provided in an upper winglet length 118 of from 90 to 110 inches. The lower winglet length 218 may extend from the lower winglet root 202 to the lower winglet tip 206 and may be provided in a lower winglet length 218 of from approximately 30 to 100 inches. For example, the lower winglet 200 may be provided in a lower winglet length 218 of from 50 to 70 inches. However, the upper winglet 100 and the lower winglet 200 may be provided in any length and are not limited to the length ranges mentioned above. Furthermore, although not shown, the winglet system 98 may be provided in an embodiment wherein the lower winglet 200 is longer than the upper winglet 100. In addition, in one or more of embodiments, the lower winglet 100 may be configured such that the lower winglet tip 206 is located approximately at the intersection of the gate span limit 38 (FIG. 6) and the roll and pitch clearance line 42 (FIG. 6) as described below.

In FIG. 3, shown is a side view of the winglet system 98 mounted to the wing tip 56 of the wing 50. The upper winglet root 102 is joined to the wing tip 56 at a wing-upper winglet juncture 150. Likewise, the lower winglet root 202 is joined to the wing tip 56 at a wing-lower winglet juncture 152. Although the illustration shows the upper winglet root 102 and lower winglet root 202 being respectively mounted to the upper and lower portions of a wing tip 56, the winglet system 98 may be configured such that the upper winglet 100 at least partially intersects the lower winglet 200 at an upper winglet-lower winglet juncture 154. In this regard, the upper winglet root 102 and the lower winglet root 202 may be mounted to the wing tip 56 at any vertical location relative to one another. In addition, although the figures of the present disclosure show the upper winglet root 102 and the lower winglet root 202 as being generally aligned with one another at the juncture of the upper and lower winglet roots 102, 202 with the wing tip 56, the upper winglet root 102 may be joined to the wing tip 56 such that the upper winglet root 102 is located forward of the lower winglet root 202. Alternatively, the lower winglet root 202 may be joined to the wing tip 56 such that the lower winglet root 202 is located forward of the upper winglet root 102. In this regard, the upper winglet root 102 may be joined to the wing tip 56 such that the upper winglet leading edge 112 is located forward of the lower winglet leading edge 212, or vice versa. Likewise, the upper winglet root 102 may be joined to the wing tip such that the upper winglet trailing edge 112 is located forward of the lower winglet trailing edge 212, or vice versa.

Furthermore, although the present disclosure illustrates the upper winglet root 102 and the lower winglet root 202 as being generally aligned with one another in a lateral direction (e.g., along a direction parallel to the lateral axis 30—FIG. 2), the upper winglet root 102 (FIG. 3) and the lower winglet root 202 (FIG. 3) may be joined to the wing tip 56 such that the upper winglet root 102 is located further outboard (e.g., further away from the wing root 52—FIG. 1) than the lower winglet root 202. Alternatively, the lower winglet root 202 may be located further outboard than the upper winglet root 202. In this regard, the wing tip 56 may be defined as approximately the outermost ten (10) percent of the length of the wing 50 from the wing root 52 (FIG. 1) to the wing tip 56 (FIG. 1). The upper winglet root 102 and the lower winglet root 202 are not limited to being joined to the wing 50 at the extreme outermost end of the wing tip 56. For example, the upper winglet root 102 and the lower winglet root 202 of the upper and lower winglets 100, 200 may be joined to the wing(s) 50 at any location such that the lower winglets 200 (FIG. 8) on the oppositely-disposed wing tips 56 (FIG. 8) of the aircraft 10 (FIG. 8) define the effective wing span 82 (FIG. 8) when the wings 50 are under the approximate 1-g flight loading 78 (FIG. 8). In an embodiment, the upper winglet root 102 and/or the lower winglet root 202 may be joined to the wing 50 at any location from the extreme outermost end of the wing tip 56 to any location on the outermost ten (10) percent of the length of the wing 50.

In FIG. 3, the upper winglet 100 and the lower winglet 200 may be swept aftwardly and may additionally be formed with a taper ratio of tip chord 108, 208 to corresponding root chord 104, 204. In an embodiment, the taper ratio of the upper winglet 100 and/or the lower winglet 200 may be in the range of from approximately 0.15 to 0.50. For example, the taper ratio of the upper winglet 100 and/or the lower winglet 200 may be in the range of from approximately 0.20 to 0.25. However, the upper winglet 100 and/or the lower winglet 200 may be formed with a taper ratio that is outside of the 0.15 to 0.50 range and may be selected in conjunction with a twist angle 122 or washout that may optionally be included in the upper winglet 100 and/or the lower winglet 200 as described below to provide a desired load distribution.

The upper winglet 100 and the lower winglet 200 each have a leading edge 110, 210 and a trailing edge 112, 212. In an embodiment, the intersection of the upper winglet leading edge 110 and/or the lower winglet leading edge 210 with the wing tip 56 may be located aft of the wing leading edge 60 at the wing tip 56 which may minimize flow separation at certain flight conditions. In the embodiment shown in FIG. 3, the upper and lower winglet 100, 200 are configured such that the upper winglet leading edge 110 intersects the lower winglet leading edge 210 at a location that is aft of the wing leading edge 60. It is contemplated that the intersection of the upper winglet leading edge 110 and/or the lower winglet leading edge 210 with the wing tip 56 may be generally coincident with or located approximately at the wing leading edge 60. The upper winglet trailing edge 112 and/or the lower winglet trailing edge 212 may join or intersect the wing tip 56 at a location that is forward of the wing trailing edge 62 as shown in the embodiment of FIG. 3. However, the upper winglet trailing edge 112 and/or the lower winglet trailing edge 212 may join or intersect the wing tip 56 at any location that is no further aft than the wing trailing edge 62.

Even further, the winglet system 98 may be provided in alternative embodiments wherein the upper winglet trailing edge 112 and/or the lower winglet trailing edge 212 may intersect the wing tip 56 at a location that is approximately coincident with the wing trailing edge 62 or at a location that is generally aft of the wing trailing edge 62 as described below. In any embodiment disclosed herein, the winglet system 98 may be configured such that the upper winglet root chord 104 and/or the lower winglet root chord 204 may be longer than the wing tip chord 58. In addition, the winglet system 98 may be configured such that the upper winglet root chord 104 and/or the lower winglet root chord 204 may be shorter than the wing tip chord 58. In an embodiment, the winglet system 98 may be configured such that a portion of the upper winglet root chord 104 and/or lower winglet root chord 204 extends forward of the wing leading edge 60. Similarly, the winglet system may be configured such that a portion of the upper winglet root chord 104 and/or lower winglet root chord 204 extends aft of the wing trailing edge 62.

In FIG. 3, the upper winglet 100 and the lower winglet 200 each have a root chord 104, 204 at the location where the upper winglet 100 and lower winglet 200 respectively join the wing tip 56. The wing tip 56 has a wing tip chord 58. The winglet system 98 may be configured such that the upper winglet root chord 104 has a length that is at least approximately 50 percent of the length of the wing tip chord 58. Likewise, the lower winglet 200 may be configured such that the lower winglet root 202 chord has a length that is at least approximately 50 percent of the length of the wing tip chord 58. In an embodiment, the upper winglet root chord 104 and/or the lower winglet root chord 204 may each have a length in the range of from approximately 60 to 100 or more percent of the length of the wing tip chord 58. Additional parasitic drag that may result from a relatively long root chord of the upper winglet 100 and/or the lower winglet 200 may be mitigated by including a leading edge root glove 138, 238 (FIG. 12) at a juncture 150 of the upper winglet 100 to the wing tip 56 and/or at a juncture 152 of the lower winglet 200 to the wing tip 56.

The leading edge root gloves 138, 238 may minimize the additional parasitic drag generated by the relatively long upper and lower winglet root chords 104, 204 at the juncture thereof with the wing tip 56 as described below by avoiding the need to carry the length of the upper and lower winglet root chords 104, 204 all the way to the respective upper and lower winglet tip 106, 206. Advantageously, by sizing the upper winglet 100 and/or lower winglet 200 such that the upper winglet root chord 104 and/or the lower winglet root chord 204 have a length of at least approximately 50 percent of the length of the wing tip chord 58, the aerodynamic load of the wing tip 56 may be divided between the upper winglet 100 and the lower winglet 200 as opposed to an arrangement wherein a single upper winglet 280 (FIG. 9) is provided for carrying the full aerodynamic load of the wing tip 56.

In an example of the embodiment of FIG. 3, for a wing tip 56 having a section lift coefficient of 1.0 and wherein the upper winglet root chord 104 and the lower winglet root chord 204 are substantially equal in length to the length of the wing tip chord 58, the upper winglet root 102 carries a section lift coefficient of 0.5 and the lower winglet root 202 carries a section lift coefficient of 0.5. In contrast, in an arrangement wherein a single upper winglet 280 (FIG. 9) is provided with no lower winglet, the single upper winglet 280 would carry the full section lift coefficient of 1.0. A higher section lift coefficient at the root of the single upper winglet 280 may correspond to a greater propensity for flow separation as may occur in cruise flight and/or at high-lift conditions. Such flow separation may result in reduced effectiveness of the single upper winglet 280 and may lead to buffeting or other undesirable characteristics. A further advantage of the combination of upper and lower winglets 100, 200 of the present disclosure instead of a single upper winglet 280 is that a single upper winglet 280 may not provide an effective increase in wing span because a single upper winglet tip would move inwardly (e.g., toward an opposing upper winglet tip mounted on an opposite wing of the aircraft) as the wings are deflected upwardly under a 1-g wing loading.

FIG. 4 is a top view of the upper winglet 100 mounted to the wing tip 56. The upper winglet leading edge 110 may be oriented at a leading edge sweep angle 114 of between approximately 20 and 70 degrees. The sweep angles 114, 214 in FIGS. 4-5 may be measured relative to the lateral axis 30 (FIG. 1) of the aircraft 10 (FIG. 1). The upper winglet leading edge 110 may optionally be provided with a leading edge sweep angle 114 that is outside of the 20-70 degree range. FIG. 4 further illustrates an upper winglet twist angle 122 or washout that may optionally be incorporated into the upper winglet 100. Twist angle 122 may be incorporated into the upper winglet 100 as a means to control the load distribution along the upper winglet 100. In FIG. 4, the upper winglet twist angle 122 at any point along the upper winglet 100 may be defined relative to a root chord lower surface reference line 105 which represents the angle of incidence of the lower surface of the upper winglet root 102. In an embodiment, the upper winglet 100 may be provided with an upper winglet twist angle 122 of up to approximately −7 degrees wherein the upper winglet tip 106 may be oriented at a greater negative angle of incidence than the upper winglet root 102. For example, the upper winglet 100 may be provided with an upper winglet twist angle 122 of approximately −3 to −5 degrees. The upper winglet twist angle 122 along the upper winglet root 102 toward the upper winglet tip 106 may have a constant rate along the upper winglet length 118. However, the upper winglet twist angle 122 may be applied at a varying rate along the upper winglet length 118.

FIG. 5 is a top view of the lower winglet 200 mounted to the wing tip 56. The lower winglet leading edge 210 may be oriented at a relatively large leading edge sweep angle 214 of between approximately 20 and 70 degrees although the leading edge sweep angle 214 may be larger or smaller than the 20-70 degree range. Advantageously, the relatively large leading edge sweep angle 214 of the lower winglet 200 provides a raked arrangement for the lower winglet 200 which locates the center of pressure 230 (FIG. 14) of the lower winglet 200 relatively far aft of the torsional axis 72 (FIG. 14) of the wing 50. As described in greater detail below, under certain flight conditions such as during a wind gust 46 (FIG. 14), the location of the lower winglet 200 center of pressure 230 at a point that is aft of the torsional axis 72 of the wing 50 advantageously results in a nose-down moment 250 (FIG. 14) which effectively rotates the wing tip 56 in a nose-down direction about the torsional axis 72 (FIG. 9) and temporarily reduces the effective angle of incidence 48 (FIG. 14) at the wing tip 56. The reduction in the effective angle of incidence 48 at the wing tip 56 results in a reduction in the bending load that would otherwise be imposed on the wing 50.

Furthermore, a relatively large leading edge sweep angle 214 of the lower winglet 200 combined with a relatively thick leading edge airfoil (not shown) of the lower winglet 200 may result in a well-defined, steady vortex (not shown) developing on the lower winglet 200 and which may reduce the propensity towards flow separation and buffeting at low-speed, high-lift conditions. As indicated above with regard to the upper winglet 100, the lower winglet 200 may be provided with a twist angle 222. In FIG. 5, the lower winglet twist angle 222 at any point along the lower winglet 200 may be defined relative to a root chord lower surface reference line 205 which is a line representing the angle of incidence of the lower surface of the lower winglet root 202. The lower winglet 200 may be provided with a twist angle 222 of up to approximately −7 degrees such as a twist angle 222 of approximately −3 to −4 degrees and which may provide a means to control the load distribution along the length of the lower winglet 200.

FIG. 6 is a schematic front view of the aircraft 10 showing a wing 50 in one of three different shapes representing constraints that may dictate the size and orientation of the upper and lower winglets 100, 200. The aircraft wing 50 is shown in solid lines in a jigged shape 74 which may represent a theoretical shape of the wing 50 when constrained by assembly tooling such as during manufacturing of the aircraft 10 as described above. The wing 50 is also shown in phantom lines in a downwardly-deflected ground static loading 76 shape which the wing 50 may assume such as when the aircraft 10 is parked at a gate of an airport terminal. The ground static loading 76 shape of the wing 50 is in response to gravitational force acting on the mass of the wings 50, propulsion units 16 (FIG. 1), and/or other systems. The wing 50 is also shown in phantom lines in an upwardly-deflected 1-g flight loading 78 shape (e.g., 1-g wing loading) as may occur when the aircraft 10 is in level cruise flight and subjected to aerodynamic lifting loads.

FIG. 6 illustrates the rigging or configuration of the winglet system 98 on a typical aircraft 10 wherein the upper winglet 100 and the lower winglet 200 are located at the maximum outboard position subject to several constraints. For example, the aircraft 10 is supported on the static ground line 40 which may represent an airport ramp (not shown) on which the aircraft 10 may be parked at a gate near a terminal. The aircraft 10 may be subject to a gate span limit 38 represented by the vertical phantom line in FIG. 6. The gate span limit 38 may be a predefined limit. For example, the gate span limit may be predefined by a regulatory agency as the maximum wing span of an aircraft that may safely operate within or fit the geometric constraints of a gate location at an airport terminal. Gate span limits 38 may be categorized into groups or codes based on maximum wing span. In this regard, the Federal Aviation Administration (FAA) and the International Civil Aviation Organization (ICAO) categorize aircraft as one of Group I through Group VI (FAA), or as one of Code A through Code F (ICAO). For example, a Code C aircraft has a gate span limit of up to, but not including, 36 meters. In the context of the present disclosure, a Code C aircraft having winglet systems 98 as disclosed herein would be limited to operating at airport gates wherein the effective wing span 80 (FIG. 6) between the outermost points on the lower winglet tips 206 is less than 36 meters when the wings 50 are under ground static loading 76.

Also shown in FIG. 6 is a roll and pitch clearance line 42 which is illustrated as an angled line extending upwardly from the landing gear 14 to provide clearance for the aircraft 10 wings 50 to avoid tip strike of a wing tip 56 such as during takeoff and/or landing. The upper winglet 100 and the lower winglets 200 are sized and oriented such that the neither the upper winglet 100 nor the lower winglet 200 violates (e.g., extends beyond) the gate span limit 38. The upper winglet 100 and the lower winglet 200 may be configured such that the upper winglet tip 106 and the lower winglet tip 206 terminate at approximately the same lateral location at the gate span limit 38 when the wing 50 is under an on-ground static loading 76. The lower winglet 200 is also sized and oriented to avoid violating the roll and pitch clearance line 42. In an embodiment, the lower winglet 200 may be sized and configured such that the lower winglet tip 206 is located approximately at the intersection of the gate span limit 38 and the roll and pitch clearance line 42. FIG. 6 further illustrates the upward deflection of the wing 50 under the approximately 1-g flight loading 78 representing the wing shape during cruise flight.

FIG. 7 illustrates an absolute span increase 86 that may be provided by the lower winglet 200 as the wing 50 moves from the on-ground static loading 76 shape to the approximately 1-g flight loading 78 shape. FIG. 7 further illustrates the relative span increase 84 of the lower winglet 200 relative to the upper winglet 100. In an embodiment, the lower winglet 200 may be configured such that upward deflection of the wing 50 under the approximate 1-g flight loading 78 causes the lower winglet 200 to move from the static position 240 to an in-flight position 242 and resulting in the relative span increase 84 of the wing 50. In an embodiment as shown in FIG. 7, the upper winglet tip 106 may be substantially vertically aligned with the lower winglet tip 206 such as at the gate span limit 38 under on-ground static loading 76 of the wing 50. The relative span increase 84 may be defined as the horizontal distance between the upper winglet tip 106 and the lower winglet tip 206 when the lower winglet 200 is in the in-flight position 242.

The winglet system 98 may also be provided in an embodiment wherein the upper winglet tip 106 is not vertically aligned (not shown) with the lower winglet tip 206 when the wing 50 is under on-ground static loading 76 such that the relative span increase 84 is the difference between the horizontal distance between the upper and lower winglet tip 106, 206 when the lower winglet 200 is in the static position 240, and the horizontal distance between the upper and lower winglet tip 106, 206 when the lower winglet 200 is in the in-flight position 242. Advantageously, the orientation and sizing of the lower winglet 200 may result in an increase in effective wing span 80 during upward deflection of the wing 50 under the approximate 1-g flight loading 78 relative to the reduction in effective span that would occur with a single upper winglet 280 (FIG. 9) mounted to each of the wing tips 56 (FIG. 8). The winglet system 98 as disclosed herein may also be configured such that the relative span increase 84 or the increase in effective wing span 80 is due at least in part to aeroelastic bending or deflection of the lower winglet 200 and/or due to movement (e.g., pivoting) of the lower winglet 200 at the juncture of the lower winglet root with the wing tip 56.

FIG. 8 is a front view of the aircraft 10 illustrating the lower winglet 200 on each wing tip 56 moved from a static position 240, wherein the wing 50 is subjected to a ground static loading 76, to an in-flight position 242, wherein the wing 50 is subjected to the approximate 1-g flight loading 78. The in-flight position 242 may be the result of an upward and outward movement of the lower winglet tip 206 from the static position 240 along the arc as shown in FIG. 6. Also shown in FIG. 8 is the effective wing span 80 of the wings 50 in the ground static loading 76 condition and the effective wing span 82 of the wings 50 in the approximate 1-g flight loading 78. The increase in wing span occurs in response to movement of the lower winglets 200 from the static position 240 to the in-flight position 242 along the arc illustrated in FIG. 6. The effective wing span 82 is measured between the outermost portions of the lower winglet tips 206 on opposing wing tips 56 of an aircraft 10.

In FIG. 8, the lower winglet 200 is also advantageously oriented at an anhedral angle 224 of no less than approximately 15 degrees during upward deflection of the wing 50 under the approximate 1-g flight loading 78. In a further embodiment, the lower winglets 200 may be configured such that the anhedral angle 224 is in the range of from approximately 15 to approximately 30 degrees when the wing 50 is under the approximate 1-g flight loading 78. However, the lower winglet 200 may be oriented at any anhedral angle 224, without limitation. The upper winglet 100 may be oriented at a dihedral angle 124 of at least approximately 60 degrees during upward deflection of the wing 50 under the approximate 1-g flight loading 78. However, the upper winglet 100 may be oriented at any dihedral angle 124, without limitation.

Figure 10:
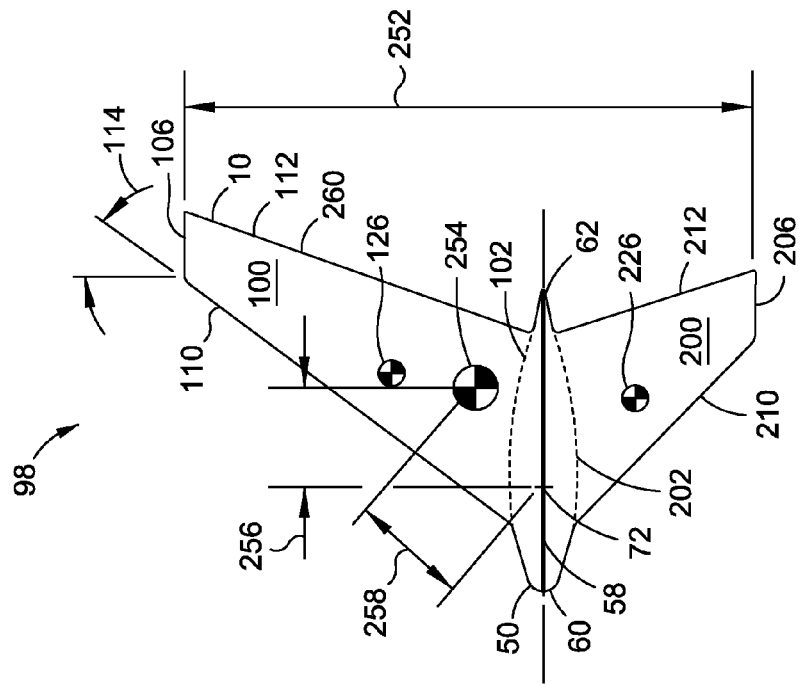
FIG. 10 is a side view of the winglet system disclosed herein wherein the combination of the upper and lower winglet results in a combined center of gravity located at a reduced longitudinal offset to the torsional axis relative to the greater longitudinal offset for the single upper winglet and which advantageously minimizes the inertial effects of the winglet system on the flutter of the wing.
Figure 9:
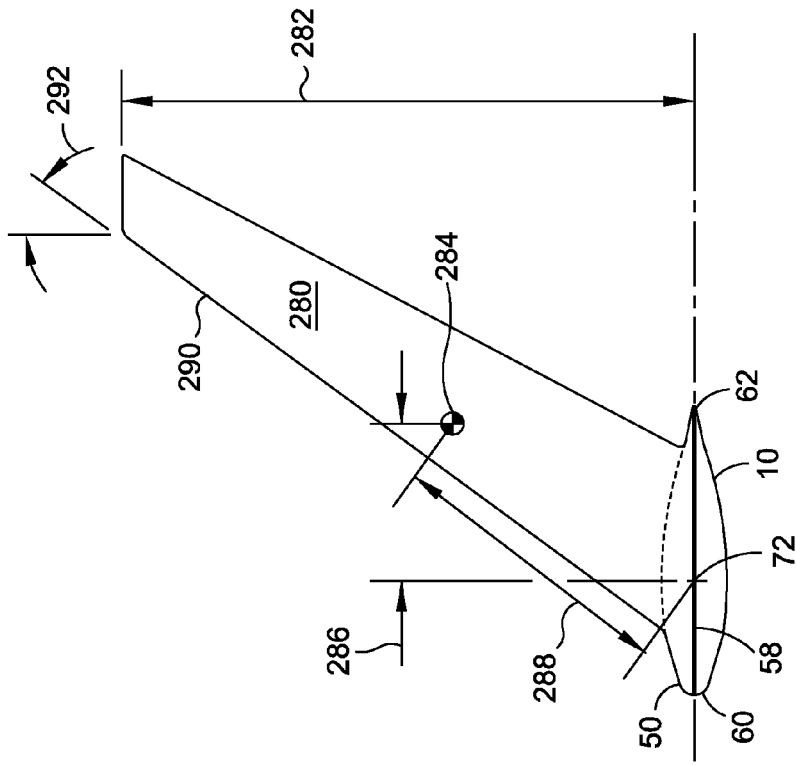
FIG. 9 is a side view of an embodiment of a single upper winglet having a center of gravity located at a longitudinal offset from a torsional axis of the wing.

Referring to FIGS. 9-10, shown in FIG. 9 is a single upper winglet 280 which is provided for comparison only to the winglet system 98 of FIG. 10. In this regard, the single upper winglet 280 is not representative of an embodiment of the winglet system 98 disclosed herein. The single upper winglet 280 in FIG. 9 is mounted to a wing tip 56 and has a winglet area 290 and center of gravity 284 located at a relatively large longitudinal offset 286 and relatively large radial offset 288 from the torsional axis 72 of the wing 50. The single upper winglet 280 in FIG. 9 has substantially the same height 282 as the combined height 252 of the upper winglet 100 and the lower winglet 200 in FIG. 10. In addition, the single upper winglet 280 in FIG. 9 has the combined winglet area 260 of the upper winglet 100 and the lower winglet 200 in FIG. 10 and has a leading edge sweep angle 292 that is substantially equivalent to the sweep angle 114 of the upper winglet 100.

FIG. 10 shows an embodiment of the winglet system 98 as disclosed herein having an upper winglet 100 having a center of gravity 126 and a lower winglet 200 having a center of gravity 226. The upper winglet 100 and the lower winglet 200 have a combined height 252. Advantageously, the upper winglet 100 and the lower winglet 200 have a combined winglet area and a combined center of gravity 254 that is located at a reduced longitudinal offset 256 and reduced radial distance 258 from the wing torsional axis 72 relative to the longitudinal offset 286 of the single upper winglet 280 of FIG. 9. The upper winglet 100 and lower winglet 200 in FIG. 10 are configured such that the longitudinal offset 256 of the combined center of gravity 254 is less than the longitudinal offset 286 of the upper winglet center of gravity 284 of the single upper winglet 280 in FIG. 9. Advantageously, the reduced amount of longitudinal offset 256 of the combined center of gravity 254 of the presently disclosed winglet system 98 of FIG. 10 may provide more favorable flutter characteristics than the single upper winglet 280 shown in FIG. 9. For example, the presently disclosed winglet system 98 of FIG. 10 may minimize the need for modification or adjustment of the wing 50 that may be required by the single upper winglet 280 of FIG. 9 such as stiffening the wing 50 structure or adding ballast weight (not shown) to the wing leading edge 60 to counteract the inertial effects of the single upper winglet 280.

Figure 11:
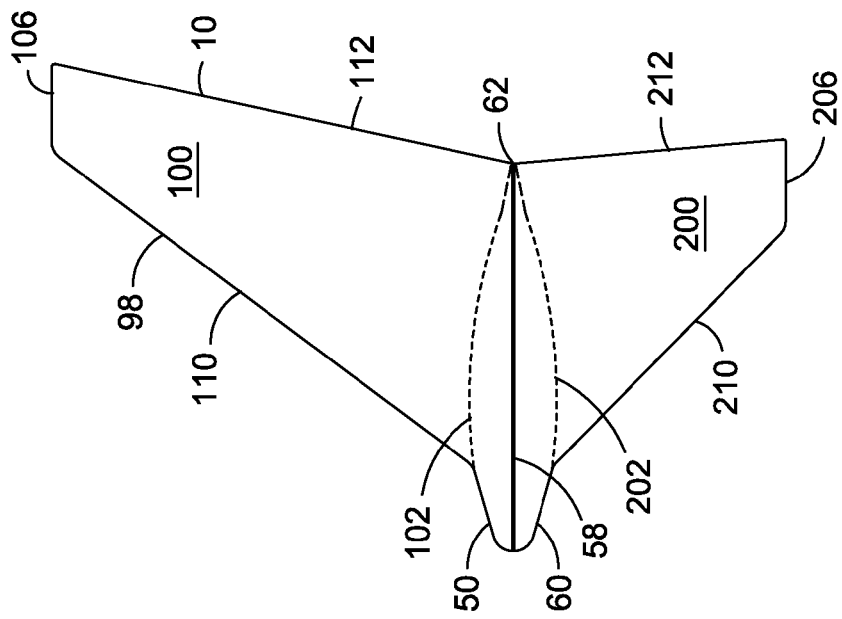
FIG. 11 is a side view of an alternative embodiment of the winglet system wherein the trailing edges of the upper winglet and lower winglet are generally aligned with the wing trailing edge.

FIG. 11 shows an alternative embodiment of the winglet system 98 wherein the trailing edges 112, 212 of the upper winglet 100 and/or the lower winglet 200 are shown generally aligned or coincident with the wing trailing edge 62. However, the upper winglet 100 and the lower winglet 200 may be configured such that the trailing edges 112, 212 of the upper winglet 100 and/or lower winglet 200 may intersect the wing tip 56 at any location relative to the wing trailing edge 62 and may extend beyond the wing trailing edge 62 as indicated above. Furthermore, the upper winglet 100 and lower winglet 200 may be provided with trailing edge fairings (not shown) for transitioning the upper winglet 100 or lower winglet 200 into the wing tip 56 and avoid abrupt shape or form changes which may result in an increase in drag.

Figure 12:
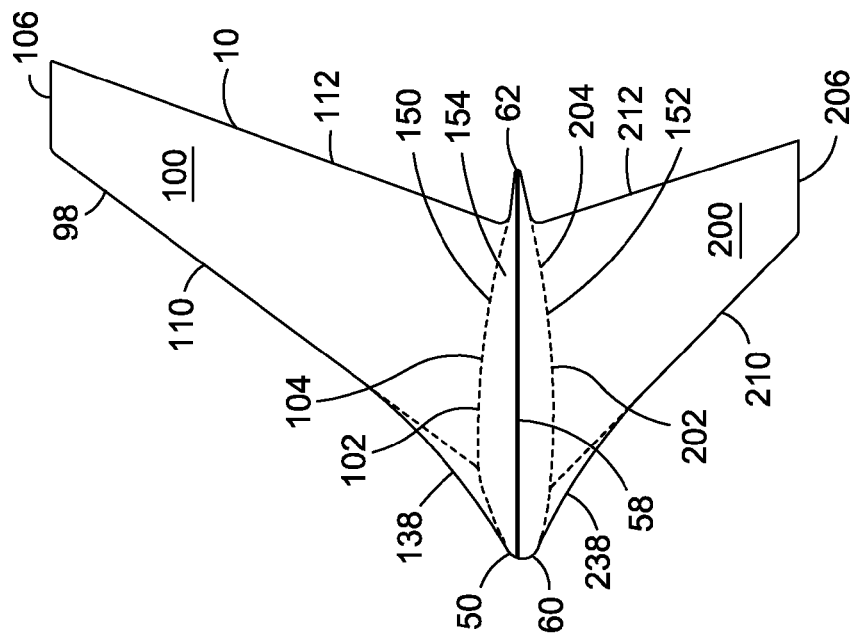
FIG. 12 is a side view of a further embodiment of the winglet system having leading edge root gloves mounted at a juncture of the wing tip to each of the upper winglet and the lower winglet.

FIG. 12 shows a further embodiment of the winglet system 98 wherein each one of the upper winglet 100 and the lower winglet 200 includes leading edge root gloves 138, 238 mounted at the juncture of the upper winglet 100 and lower winglet 200 with the wing tip 56. The leading edge gloves 138, 238 may be installed at a location proximate the upper and lower winglet leading edges 110, 210 of the upper and lower winglets 100, 200. As described above, the leading edge root gloves 138, 238 may provide additional chord at the upper and lower winglet leading edges 110, 210 with minimal increase in area and which may minimize parasitic drag of the aircraft 10. The upper winglet 100 and/or the lower winglet 200 may be configured such that the respective upper winglet root chord 104 and lower winglet root chord 204 have a length that is at least approximately 50 percent of the length of the wing tip chord 58. For example, the upper winglet 100 and/or the lower winglet 200 may be configured such that the respective upper winglet root chord 104 and lower winglet root chord 204 are in the range of from approximately 60 to 100 percent or more of the length of the wing tip chord 58.

Figure 13:
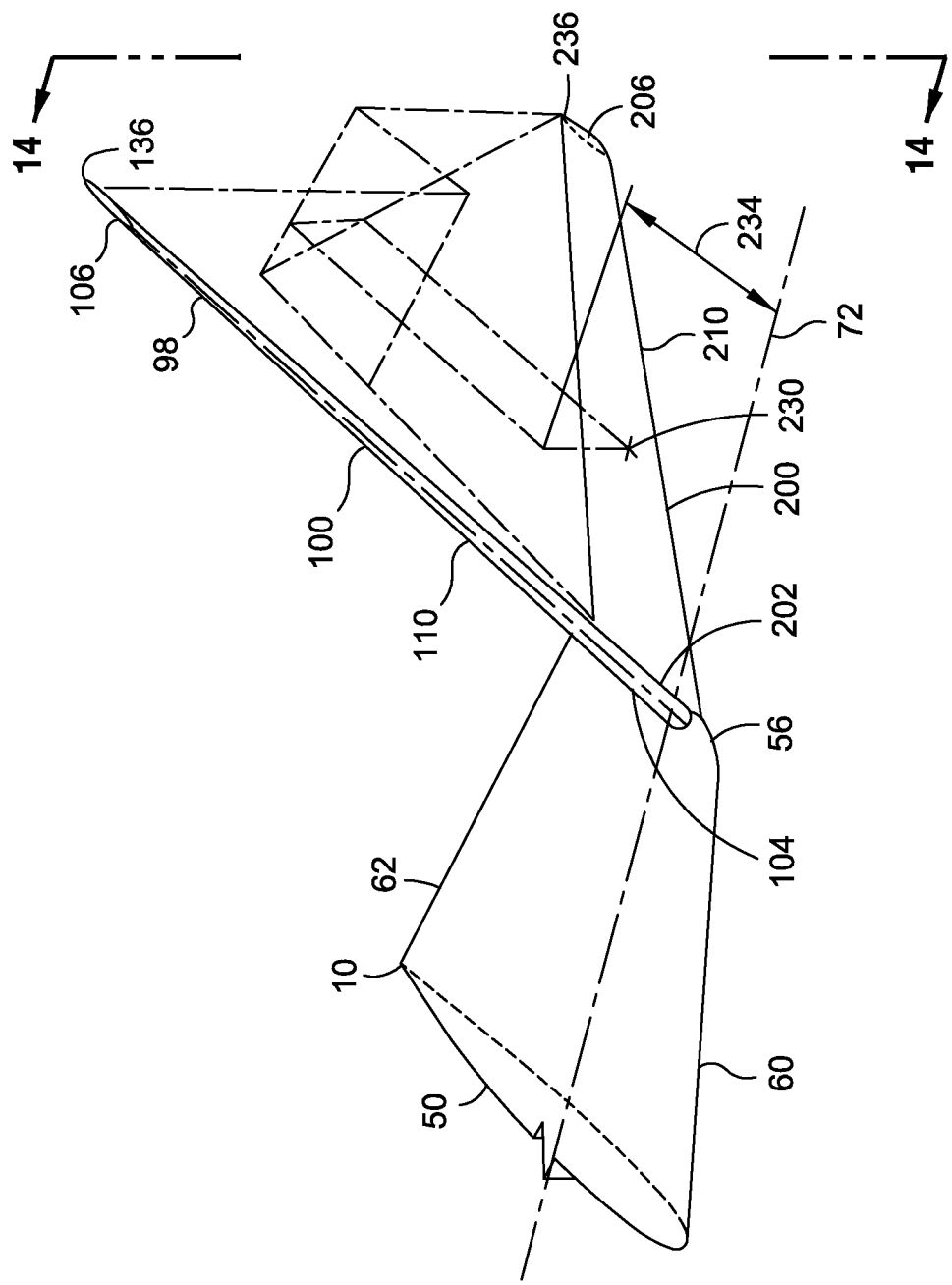
FIG. 13 is a perspective view of an embodiment of the winglet system illustrating a center of pressure of the lower winglet located aft of the wing torsional axis due to a relatively large sweep angle of the lower winglet and due to a relatively small anhedral angle of the lower winglet.
Figure 14:
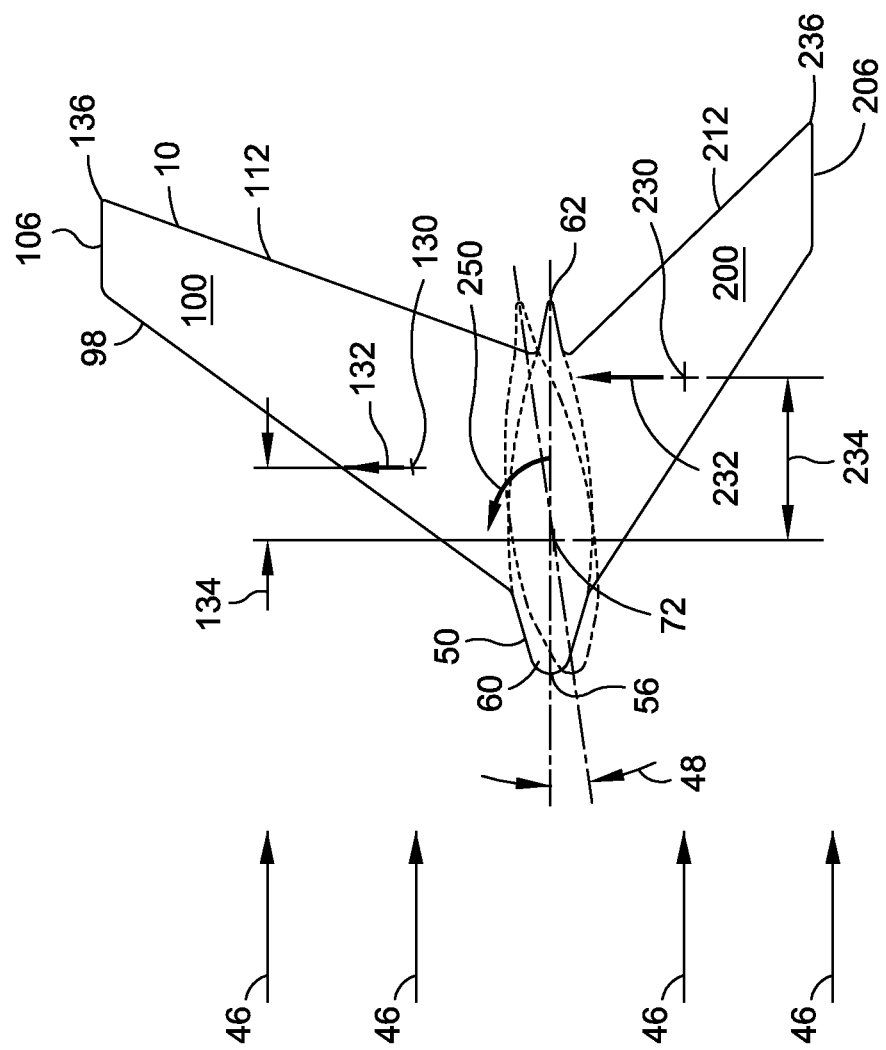
FIG. 14 is a side view of the winglet system taken along line 14 of FIG. 13 and illustrating a nose-down moment exerted on the wing tip in response to an increase in lift of the lower winglet in response to a gust load.

FIGS. 13-14 illustrate an embodiment of the winglet system 98 wherein the lower winglet 200 is oriented such that the aerodynamic center of pressure 230 of the lower winglet 200 is located at a relatively large moment arm 234 from the intersection of the wing torsional axis 72 with the wing tip 56. In this regard, the lower winglet 200 is provided with a relatively large leading edge sweep angle 214 (FIG. 5) which results in the location of the lower winglet 200 aft of the wing torsional axis 72. For example, FIG. 13 illustrates an embodiment of the winglet system 98 wherein the lower winglet 200 and the upper winglet 100 are arranged such that an aftmost point 236 of the lower winglet tip 206 is located aft of an aftmost point 136 of the upper winglet tip 106.

FIG. 14 illustrates a wind gust 46 acting on the wing 50 and resulting in an increasing lift increment of the lower winglet 200 during the wind gust 46. Due to the relatively small anhedral angle 224 (e.g., less than 30 degrees—FIG. 8) of the lower winglet 200 when the wing 50 is under the approximate 1-g flight loading 78, the gust load results in an a lower winglet lift increase 232 of the lower winglet 200 which results in a nose-down moment 250 on the wing tip 56. The upper winglet 100 may also generate an upper winglet lift increase 132 at an upper winglet center of pressure 130 due to the gust load. The upper winglet lift increase 132 may be applied about the relatively short moment arm 134 and which may contribute toward the nose-down moment 250 on the wing tip 56. However, the magnitude of the upper winglet lift increase 132 may be small relative to the lower winglet lift increase 232 due to the relatively large dihedral angle 124 (e.g., at least 60 degrees—FIG. 8) of the upper winglet 100 when the wing 50 is under the approximate 1-g flight loading 78.

Figure 15:
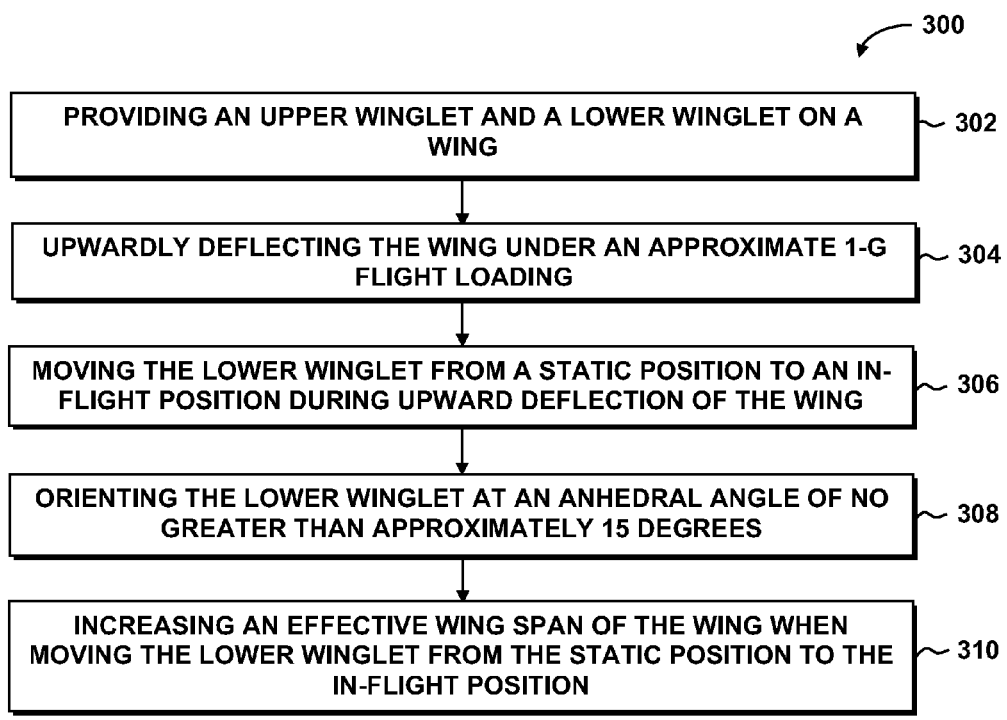
FIG. 15 is a flow diagram having one or more operations that may be included in a method of operating an aircraft.

FIG. 15 is a flow diagram of a method 300 of operating an aircraft 10 or improving the performance of the aircraft 10 using the winglet system 98 disclosed herein.

Step 302 of the method 300 may include providing an upper winglet 100 and a lower winglet 200 on a wing 50. As shown in FIG. 7, the lower winglet 200 has a static position 240 when the wing 50 is subject to a ground static loading 76. As indicated above, the wings 50 may assume a generally downwardly-deflected shape under the ground static loading 76 due to the gravitational force acting on the wings 50 and attached structure and systems.

Step 304 of the method 300 may comprise aeroelastically deflecting the wings 50 (FIG. 1) upwardly. For example, the wings 50 may be deflected upwardly under a steady state, approximate 1-g wing loading during cruise flight of the aircraft 10. The degree to which the wings 50 are deflected may be dependent upon the flexibility of the wings 50. In this regard the sizing and orientation of the upper winglet 100 (FIG. 1) and lower winglet 200 (FIG. 1) may be based in part on the extent of vertical deflection of the wing tips 56 (FIG. 1) under the approximate 1-g wing loading.

Step 306 of the method 300 may comprise moving the lower winglet 200 from the static position 240 of the lower winglet 200 to an in-flight position 242 of the lower winglet 200 during upward deflection of the wing 50 as shown in FIG. 7. The upward deflection of the wing 50 may also include aeroelastic upward deflection (not shown) of the lower winglet 200 which may increase the effective span of the lower winglet 200. The relative span increase 84 or the increase in effective wing span 80 may also be provided at least in part by movement (e.g., pivoting) of the lower winglet 200 at the juncture of the lower winglet root 202 with the wing tip 56.

Step 308 of the method 300 may comprise orienting the lower winglet 200 (FIG. 8) at an anhedral angle 224 (FIG. 8) of no less than approximately 15 degrees when the wing 50 (FIG. 8) is deflected upwardly under the approximate 1-g flight loading 78 (FIG. 8). For example, the lower winglet 200 may be oriented at an anhedral angle 224 of between approximately 15 degrees and 30 degrees when the wing 50 is under the approximate 1-g flight loading 78 of the wing. However, the lower winglet 200 may be oriented at any anhedral angle 224, without limitation, when the wing 50 is under the approximate 1-g flight loading 78.

Step 310 of the method 300 may comprise increasing an effective wing span 80 of the wing 50 when moving the lower winglet 200 from the static position 240 (FIG. 7) to the in-flight position 242 (FIG. 7). For example, FIG. 8 illustrates the wing 50 having an effective wing span 80 when the wing 50 is under the ground static loading 76. FIG. 8 also illustrates the increased effective wing span 82 of the wing 50 when the wing 50 is under the approximate 1-g flight loading 78.

Advantageously, the increase in the effective wing span 80 (FIG. 8) due to the upward deflection of the wings 50 (FIG. 8) and/or the lower winglet 200 (FIG. 8) results in an improvement in the lift-to-drag performance of the aircraft 10 (FIG. 8) due to the reduction in induced drag provided by the upper winglet 100 (FIG. 8) and lower winglet 200. Furthermore, the winglet system 98 advantageously splits or divides the wing tip 56 aerodynamic load of the wing tip 56 between the upper winglet 100 and the lower winglet 200. Due to the upper and lower winglet root chord 104, 204 (FIG. 3) being longer than approximately 50 percent of the wing tip chord 58 (FIG. 3), the division or splitting of the wing tip 56 aerodynamic load between the upper winglet 100 and the lower winglet 200 reduces the likelihood of flow separation such as when the wing 50 is at high angles of attack.

Additionally, the relatively low anhedral angle 224 (FIG. 8) of the lower winglet 200 provides a passive means for exerting a nose-down moment 250 (FIG. 14) on the wing tip 56 (FIG. 8) during gust loads on the wing 50 (FIG. 8) with the benefit of minimizing wing bending. In addition, as indicated above, a relatively large leading edge sweep angle 214 (FIG. 5) on the lower winglet 200 (FIG. 5) may promote the development of a steady vortex (not shown) on the lower winglet 200 which may reduce flow separation and buffeting at low-speed, high-lift conditions. Even further, by including an upper winglet 100 and a lower winglet 200 (FIG. 10) with the winglet system instead of providing a single upper winglet 280 (FIG. 9), the longitudinal offset 256 (FIG. 10) from the combined center of gravity 254 to the wing torsional axis 72 (FIG. 10) provides reduced wing flutter from inertial effects of the upper winglet 100 and lower winglet 200 relative to the wing flutter caused by larger inertial effects from a longer longitudinal offset of a single upper winglet 280 (FIG. 9) of equivalent area.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A winglet system, comprising:
   an upper winglet and a lower winglet each having a root chord and being mounted to a wing tip of a wing, the wing tip having a wing tip chord;
   the upper winglet root chord and the lower winglet root chord each having a length of no greater than 100 percent of the wing tip chord;
   the lower winglet having a static position when the wing is subject to an on-ground static loading; and
   the lower winglet being configured such that upward deflection of the wing under an approximate 1-g flight loading causes the lower winglet to move upwardly and outwardly from the static position to an in-flight position resulting in an effective span increase of the wing under the approximate 1-g flight loading relative to the span of the wing under the on-ground static loading.

2. The winglet system of claim 1, wherein:
   the upper winglet root chord and the lower winglet root chord each have a length of at least approximately 50 percent of the wing tip chord.

3. The winglet system of claim 1, wherein:
   the upper winglet root chord and the lower winglet root chord each have a length of from approximately 60 to 100 percent of a length of the wing tip chord.

4. The winglet system of claim 1, wherein:
   at least one of the upper winglet and lower winglet has a leading edge root glove mounted at a juncture of the wing tip with the respective upper winglet and lower winglet.

5. The winglet system of claim 1 wherein:
   the lower winglet is oriented at an anhedral angle of no less than approximately 15 degrees during the upward deflection of the wing under the approximate 1-g flight loading.

6. The winglet system of claim 1 wherein:
   the upper winglet is oriented at a dihedral angle of at least approximately 60 degrees during upward deflection of the wing under the approximate 1-g flight loading.

7. The winglet system of claim 1, wherein:
   an upper winglet tip and a lower winglet tip terminate at approximately the same lateral location when the wing is under the on-ground static loading.

8. The winglet system of claim 1, wherein:
   the upper winglet and the lower winglet each have a taper ratio of tip chord to root chord in a range of from approximately 0.15 to 0.50.

9. The winglet system of claim 1, wherein:
the upper winglet and the lower winglet have a leading edge sweep angle of between approximately 20 and 70 degrees.

10. The winglet system of claim 1 wherein:
the lower winglet has a center of pressure;
the wing having a wing torsional axis; and
the center of pressure of the lower winglet being located aft of the wing torsional axis.

11. An aircraft, comprising:
a pair of wings each having a wing tip including a wing tip chord;
an upper winglet and a lower winglet mounted to each one of the wing tips, the upper winglet and the lower winglet each having a root chord;
the upper winglet root chord and the lower winglet root chord each having a length of no greater than 100 percent of the wing tip chord;
the lower winglet having a static position when the wing is subject to an on-ground static loading; and
the lower winglet being sized and oriented such that upward deflection of the wings under an approximate 1-g flight loading causes the lower winglet to move upwardly and outwardly from the static position to an in-flight position resulting in an effective span increase of the wing under the approximate 1-g flight loading relative to the span of the wing under an on-ground static loading.

12. A method of enhancing performance of an aircraft, comprising the steps of:
providing an upper winglet and a lower winglet on a wing tip of a wing, the wing tip having a wing tip chord, the lower winglet having a static position when the wing is subject to an on-ground static loading, the upper winglet and the lower winglet each having a root chord having a length of no greater than 100 percent of the wing tip chord;
upwardly deflecting the wing under an approximate 1-g flight loading;
moving the lower winglet upwardly and outwardly from the static position to an in-flight position during upward deflection of the wing; and
causing an effective span increase of the wing under the approximate 1-g flight loading relative to the span of the wing under the on-ground static loading in response to moving the lower winglet upwardly and outwardly from the static position to the in-flight position.

13. The method of claim 12, wherein:
the upper winglet root chord and the lower winglet root chord each have a length of at least approximately 50 percent of the wing tip chord.

14. The method of claim 12, wherein:
the upper winglet root chord and the lower winglet root chord each have a length of from approximately 60 to 100 percent of a length of the wing tip chord.

15. The method of claim 12, further comprising the step of:
minimizing parasitic drag of the aircraft by using a leading edge root glove on at least one of the upper winglet and the lower winglet.

16. The method of claim 12, further comprising the step of:
orienting the lower winglet at an anhedral angle of no less than approximately 15 degrees during the upward deflection of the wing under the approximate 1-g flight loading.

17. The method of claim 12, further comprising the step of:
orienting the upper winglet at a dihedral angle of at least approximately 60 degrees during the upward deflection of the wing under the approximate 1-g flight loading.

18. The method of claim 12, wherein:
an upper winglet tip and a lower winglet tip terminate at approximately the same lateral location when the wing is under the on-ground static loading.

19. The method of claim 12, further comprising the steps of:
locating the lower winglet such that a center of pressure is aft of a wing torsional axis;
increasing lift of the lower winglet during a gust load; and
exerting a nose-down moment on a wing tip in response to an increase in the lift of the lower winglet.

20. The method of claim 12, further comprising the step of:
dividing a wing tip aerodynamic load between the upper winglet and the lower winglet.

* * * * *